Jan. 5, 1937.  F. ROWNTREE ET AL  2,066,802
PISTON
Filed Oct. 16, 1934
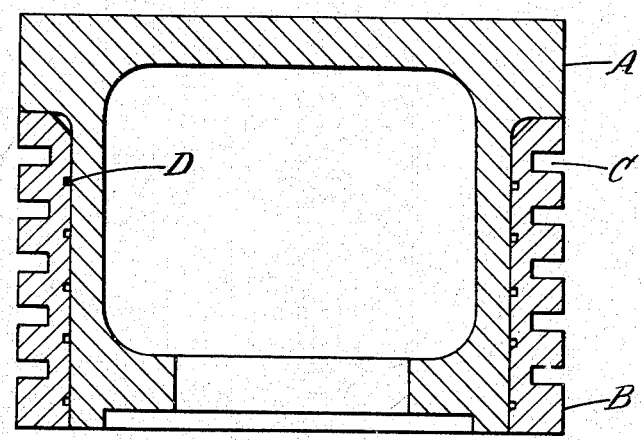
FRANCIS ROWNTREE
ALBERT JOSEPH ELWOOD KITTS
INVENTOR
BY Haseltine, Lake & Co.
ATTORNEYS Patented Jan. 5, 1937

2,066,802

UNITED STATES PATENT OFFICE 2,066,802

PISTON

Francis Rowntree, Monkseaton, and Albert Joseph Elwood Kitts, Sunderland, England, assignors of one-third to Swan, Hunter, & Wigham Richardson Limited, Newcastle-upon-Tyne, England, a British company Application October 16, 1934, Serial No. 748,434
In Great Britain March 16, 1934

4 Claims. (Cl. 309—14)

The present invention relates to pistons for use in internal-combustion engines. In such pistons difficulty has been experienced owing to wear of the grooves containing the piston rings, such wear occurring more rapidly in forged mild steel than in cast-iron pistons. It is the main object of the present invention to overcome this disadvantage, so that the piston rings remain a good fit in their grooves and the piston operates effectively over a long period.

According to the invention the piston comprises a forged mild steel body provided with a sleeve of harder metal in which grooves for piston rings are formed, the said sleeve being disposed some distance from the head of the piston so as to permit of expansion of the piston head and to avoid exposure of the sleeve to the heat of combustion. It is found appropriate to employ a steel for the said sleeve having a hardness equal to or even greater than that of cast-iron, the sleeve then retaining its exterior form and size as well as grooves intact for a satisfactory length of time. The said sleeve is preferably shrunk on to the forged piston body from the lower or skirt end thereof, and in order to prevent axial movement of the sleeve relatively to the piston body a number of serrations may be provided on the inner surface of the sleeve so that during contraction of the said sleeve, the milder steel of the body will imbed itself slightly into the serrations. The present invention thus provides a piston wherein the stresses due to expansion or contraction are lower than would occur if the piston was made wholly of the hard steel of the sleeve, whilst the wearing qualities of the piston ring grooves are equal to or even greater than those found in cast-iron pistons. Also by fitting the said sleeve onto the piston in the position aforesaid expansion of the piston head is unrestrained and at the same time the sleeve is not exposed to the heat of combustion. The piston head, thus being of mild forged steel will not crack from temperature changes but remains intact and gives long service.

In order that the invention may be clearly understood and readily carried into effect it will now be described more fully with reference to the accompanying drawing, which illustrates by way of example and in longitudinal section a piston suitable for use in an internal-combustion engine fitted with a sleeve in accordance with the present invention.

Referring to the drawing, the body of the piston A is constituted as a forging, while the sleeve B surrounding it, in which the groove C for the piston rings, not shown, are cut, is made of especially resistant material as above described. It will be seen from the drawing that the sleeve B is disposed some distance from the head of the piston and extends for the greater part of the length of the piston. The sleeve B is preferably shrunk on to the body A, since thereby there is secured intimate contact between these members so that the transmission of heat from the sleeve and piston rings to the cooling medium within the piston is not unduly impaired. As an additional precaution for retaining the sleeve B in position on the body A, there are cut in the internal periphery of the sleeve a series of serrations D; thus, when the sleeve is shrunk around the body, the comparatively soft material of which the latter is made is forced slightly into the serrations so as to form a series of keys whereby the possibility of any axial movement of the sleeve relatively to the body is prevented.

A piston of the dished type mainly for use in a steam engine, has beeen proposed comprising a piston head and piston rod formed integrally by forging them from one piece of steel, the head being forged with a peripheral cylindrical portion adapted for receiving a bronze ring (having grooves for packing rings) of a depth equal to the depth of the piston which was secured around the cylindrical peripheral portion as by casting or by the aid of heat and pressure.

Several proposals have also been made for aluminium or similar light metal or alloy pistons, in which the grooves for the piston rings were formed in reinforcing sleeves of steel or other hard metal forced or shrunk on to the head of the piston. It has also been proposed to form an aluminium or other light alloy piston by casting the aluminium piston body about sleeves of harder metal in which the piston ring grooves were formed and which were disposed some distance below the head of the piston.

The present invention however does not relate to aluminium or other light alloy pistons but essentially to pistons the bodies of which are of forged mild steel and in which the piston ring sleeves are disposed as aforesaid to provide a piston possessing the desirable characteristics referred to.

What we claim and desire to secure by Letters Patent of the United States is:—

1. In a piston head for an internal combustion engine piston of the type wherein the piston head is separate from the skirt, a forged steel body capable of withstanding high temperatures, including a crown portion having the full diameter of the piston and an integral body portion of a uniformly lesser exterior diameter than said crown portion extending from the latter, and a sleeve of steel having at least the hardness of cast iron and capable of withstanding considerable wear rigidly disposed upon, and coextensive with the entire length of said body portion up to said crown and supported by the body portion and of substantially the same exterior diameter as said crown portion and also formed with at least one groove for a piston ring.

2. In a piston head for an internal combustion engine piston of the type wherein the piston head is separate from the skirt, a forged steel body capable of withstanding high temperatures, including a crown portion having the full diameter of the piston and an integral body portion of a uniformly lesser exterior diameter than said crown portion extending from the latter, and a sleeve of steel having at least the hardness of cast iron and capable of withstanding considerable wear rigidly disposed upon, and fully coextensive with the whole exterior of said body portion, said sleeve being fully supported by the body portion and of substantially the same exterior diameter as said crown portion and also formed with at least one groove for a piston ring.

3. A piston head for an internal combustion engine piston according to claim 2, wherein the sleeve is shrunk into position upon the integral body portion of the piston head and grips said body portion very firmly so as to prevent displacement of said sleeve from said body portion.

4. A piston head for an internal combustion engine piston according to claim 2, wherein the sleeve is shrunk into position upon the integral body portion of the piston head and grips said body portion very firmly, and wherein the sleeve is interiorly formed with grooves into which the relatively softer metal of the mild steel body portion tends to project, so as to effectively prevent displacement of said sleeve from said body portion.

FRANCIS ROWNTREE.
ALBERT JOSEPH ELWOOD KITTS.